United States Patent [19]
Neti et al.

[11] 3,904,371
[45] Sept. 9, 1975

[54] CHEMILUMINESCENT AMMONIA DETECTION

[75] Inventors: Radhakrishna M. Neti, Brea; George S. Turner, Fullerton, both of Calif.

[73] Assignee: Beckman Instruments, Inc., Fullerton, Calif.

[22] Filed: Mar. 4, 1974

[21] Appl. No.: 448,021

[52] U.S. Cl........ 23/232 R; 23/230 PC; 23/253 PC; 252/447; 423/403
[51] Int. Cl.² C01B 21/26; G01N 21/52; G01N 31/10
[58] Field of Search...... 23/232 R, 230 PC, 253 PC; 423/403

[56] References Cited
UNITED STATES PATENTS

| | | | |
|---|---|---|---|
| 2,167,708 | 8/1939 | Carter | 423/403 |
| 2,467,446 | 4/1949 | Smithells | 423/403 X |
| 3,027,235 | 3/1962 | DeHaven | 423/403 |
| 3,271,113 | 9/1966 | Van Pul | 23/232 R |
| 3,647,387 | 3/1972 | Benson | 23/232 R |
| 3,652,227 | 3/1972 | Harman | 23/232 R |
| 3,659,100 | 4/1972 | Anderson | 23/232 R |
| 3,692,485 | 9/1972 | Neti | 23/232 R |
| 3,730,686 | 5/1973 | Breitenbach | 23/232 R |
| 3,746,513 | 7/1973 | Warnick | 23/232 R |

*Primary Examiner*—Morris O. Wolk
*Assistant Examiner*—Sidney Marantz
*Attorney, Agent, or Firm*—R. J. Steinmeyer; P. R. Harder

[57] ABSTRACT

Ammonia content of a gaseous mixture is determined by converting the ammonia to nitric oxide and measuring the nitric oxide. A gaseous mixture sample is passed through a heated mixture of oxides of platinum group metals and/or copper oxide together with vitreous carbon whereby any gaseous ammonia is converted catalytically into nitric oxide. Using the chemiluminescent analysis technique, the ammonia content of the gaseous mixture sample may be monitored in a suitable instrument.

6 Claims, 1 Drawing Figure

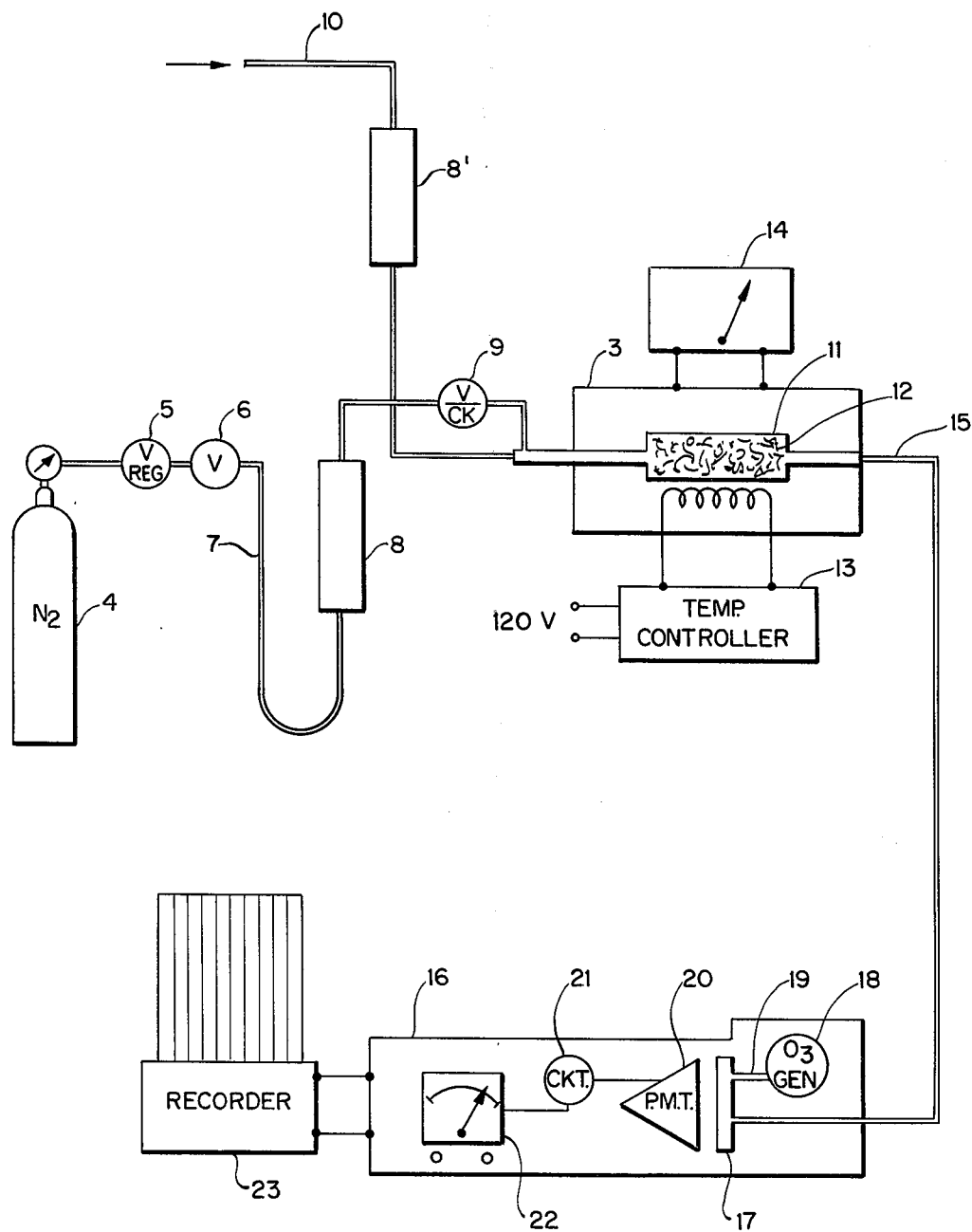

CHEMILUMINESCENT AMMONIA DETECTION

BACKGROUND OF THE INVENTION

1. Field of the Invention

This invention relates to the selective, quantitative determination of gaseous ammonia and, more particularly, to an improved method and apparatus for determining the quantity of ammonia in a gaseous mixture sample.

There has long been an interest in quickly and accurately measuring and monitoring ammonia gas concentrations in air and various gas streams. Ammonia gas measurement and monitoring is important in pollution control and in varied industrial ammonia gas quantitative analysis.

2. Description of the Prior Art

Ammonia in a gaseous state has been detected by either a wet chemical method or by optical absorption techniques. In the wet chemical method (Nessler reaction), the color developed as the result of a reaction between ammonia and alkaline mercuric iodide is spectrophotometrically measured. This method is time consuming and lacks a wide dynamic range. Also it is not readily adaptable for continuous monitoring.

In the optical absorption technique, the absorption of light by ammonia is measured in the appropriate wavelength range. The accuracy of measurements using this technique may be affected by various factors such as the presence of water vapor, low concentrations in parts per million, and any contamination interferences.

Recently chemiluminescent techniques have been developed which measure emitted light resulting from the chemical interaction of nitric oxide and ozone. This discovery permits analysis of small parts per million samples as compared with conventional photometric techniques. The gas phase reaction of nitric oxide and ozone has an extreme sensitivity and a wide dynamic range. Several commercial chemiluminescent instruments are available for determining nitric oxide and nitrogen dioxide. However, these instruments do not quantitatively measure ammonia directly because they depend upon the conversion of ammonia to nitric oxide. Various converters are available for converting ammonia to nitric oxide in steps with varying degrees of efficiency. These include either metallic or nonmetallic catalysts operated at an optimum temperature for conversion of nitrogen dioxide to nitric oxide.

An article by Breitenbach and Shelef in the *Journal of Air Pollution Control Association*, Vol. 23, No. 2, pp. 128–131 and referring to U.S. Pat. application Ser. No. 158,003 filed June 3, 1971, describes a carbon-copper system for the oxidation of gaseous ammonia into nitric oxide. However, the device described therein has a limited operating temperature range and a short life. As pointed out in that article at page 130, the upper temperature range limit is 475°C. This limits the extent of conversion of ammonia to nitric oxide with the oxidizing material employed.

Accordingly, such prior art devices have had limited economic use.

In a pending patent application Ser. No. 263,543, assigned to the same assignee as the present application, apparatus is described for converting nitrogen dioxide to nitric oxide for subsequent reaction with ozone in the chemiluminescent technique. However, in that arrangement the ammonia response is typically only about 2% of the nitric oxide response.

In another pending patent application Ser. No. 380,740, also assigned to the same assignee as the present application, a method and apparatus are described for quantitatively analyzing the ammonia content percentage of a gaseous mixture by converting the gaseous ammonia into nitric oxide for chemiluminescent analysis. However, in that arrangement the conversion of ammonia to nitric oxide takes place in steps. The sample is first converted to an oxide or oxides of nitrogen, which are then subjected to a temperature between 500° and 560°C. A sample containing ammonia is first oxidized in a reaction tube containing copper oxide and the oxidized sample is passed into another reaction tube containing vitreous carbon to reduce the higher oxides of nitrogen to nitric oxide.

Accordingly, it is an object of the invention to provide an improved method and apparatus for quantitatively determining the amount of ammonia in a gaseous mixture sample and to utilize a chemiluminescent nitric oxide analyzer.

Other and further objects, features and advantages of the invention will become apparent as the description proceeds.

SUMMARY OF THE INVENTION

In carrying out the invention in accordance with a preferred form thereof, a single reaction tube or converter is employed for efficiently converting ammonia into nitric oxide at a moderate temperature. The sample so converted is then caused to react chemically with ozone to produce light energy which can be detected photoelectrically for metering and recording.

A sample of a gaseous mixture containing an unknown quantity of ammonia is injected into the reaction tube with an inert carrier such as nitrogen gas for conversion of the ammonia to nitric oxide. The reaction tube or converter is packed with a catalyst which converts the ammonia to nitric oxide at a relatively low temperature compared with prior art converters. In a preferred embodiment of the invention, the converter is packed with a mixture of copper oxide and vitreous carbon in particulate form such as granules or filaments. The vitreous carbon is of a type produced by Beckwith Carbon Corporation. As the gaseous sample to be analyzed passes through the converter, the ammonia in the sample combines with the copper oxide and vitreous carbon in accordance with the following equations:

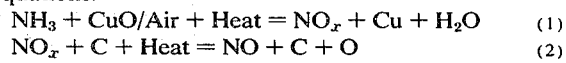

$$NH_3 + CuO/Air + Heat = NO_x + Cu + H_2O \quad (1)$$
$$NO_x + C + Heat = NO + C + O \quad (2)$$

Thus, it can be seen that the gaseous ammonia tends to be oxidized to oxides of nitrogen which are, however, reduced to nitric oxide. The use of vitreous carbon in direct conjunction with copper oxide as a catalyst has the unique advantage of causing the reaction to take place at a relatively low temperature. The use of vitreous carbon also avoids consumption of the catalysts, particularly the carbon.

A suitable instrument employing the chemiluminescent technique is then used to sample a constant volume of the gaseous mixture by causing the nitric oxide to combine with ozone in accordance with the following equation:

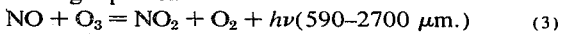

$$NO + O_3 = NO_2 + O_2 + h\nu(590-2700 \; \mu m.) \quad (3)$$

A light detector, within the chemiluminescent analyzer instrument, converts the emitted light into electrical energy which then may be metered and recorded, as a fixed quantitative measurement of the ammonia level of the unknown gaseous mixture sample.

BRIEF DESCRIPTION OF THE DRAWING

The single FIGURE of the drawing is a schematic diagram of ammonia analysis apparatus constituting an embodiment of the invention.

DESCRIPTION OF THE PREFERRED EMBODIMENT

There is a source of carrier gas such as a compressed air bottle 4 connected through a regulating valve 5, a control valve 6, a tube 7, a flowmeter 8 and a check valve 9 to the side of a reaction tube 11. The reaction tube 11 has a central inlet through a tube 10 for an air or other sample to be monitored. The central portion of the reaction tube 11 is packed with intermixed particulate matter 12 consisting of granules or filaments of copper oxide and vitreous carbon. The reaction tube 11 is provided with means for maintaining it at a controlled temperature such as a surrounding muffle or enclosing furnace 3. For maintaining the temperature at a predetermined value an electrical resistance type of temperature controller 13 may be provided and a pyrometer 14 may be provided for monitoring the temperature.

The reaction tube 11 has an outlet connected through tubing 15 to a chemiluminescent analyzer 16 which may be of the type described in U.S. Pat. No. 3,692,485. As shown, such an analyzer may include a reaction chamber 17 having an inlet from the tube 15 and another inlet from an ozone source 18 through a tube 19. There is a translucent wall exposed to a photomultiplier tube 20, connected through suitable circuitry 21 to an indicator 22 and a recorder 23. With a packing 12 comprising a loose mixture of copper oxide and vitreous carbon the temperature controller 13 is set at a temperature within the range between 400 and 460°C.

OPERATION

The gaseous mixture constituting the sample to be monitored enters the reaction tube 11 through a tube 10 and a flowmeter 8'; the tube 11 receives carrier gas from the source 4 through the tubing 7 so as to carry the sample through the reaction tube 11 and into the chemiluminescent analyzer 16. As the gaseous sample to be analyzed passes through the tube 11 the ammonia in the sample is oxidized as the result of the presence of oxygen in the air included in the sample and the catalytic action of the vitreous carbon and the copper oxide, which latter supplies any requisite deficiency in oxygen to convert the sample to nitric oxide and water vapor. The water vapor is condensed in a condensor (not shown) interposed in the tubing 15 and the nitric oxide reacts with ozone in the chamber 17 to produce light the intensity of which depends upon the concentration of nitric oxide in the sample. The light is measured or recorded in the units 22 and 23.

The invention is not limited to the use of particular structural materials. However, it is found that satisfactory results are obtained by utilizing a reaction tube 11 composed of glass comprising a high percentage of silicon oxide, approximately 96% plus impurities, sold under the trade name Vycor glass. Use of packing 12 consisting of coarse granules or of approximately sixteenth-inch diameter filaments about one-half inch in length is advantageous in promoting gas flow and providing adequate exposure of the gas sample to the catalyst.

The reaction tube 11 described herein can be operated at a temperature range between 400° and 550°C, although the range between 400° and 460°C is preferred and satisfactory results are obtained at a temperaure of about 430°C.

Tests have been made employing granular copper oxide alone as the packing for the tube 11 but it has been found that temperatures in excess of 550°C are required to obtain the reduction of oxides of nitrogen to nitric oxide. Employing such a high temperature has a disadvantage of causing some chemical dissociation of the nitric oxide into nitrogen and oxygen.

When a catalyst is used comprising oxides of platinum, paladium, rhodium or other oxides of platinum group metals together with rare earth oxides as activators, temperature is maintained in the range between 900° and 950°C.

Other oxides may be used in the reaction tube 11 but it has been found that copper oxide in conjunction with vitreous carbon gives the best results. Tests made on cobalt oxide alone also require the relatively high temperature in excess of 550°C in order to reduce oxides of nitrogen to nitric oxide. Cobalt oxide in conjunction with vitreous carbon could theoretically be employed and has been found to be operative at temperatures lower than 550°C. However, a substrate for the cobalt oxide particles is provided if cobalt oxide is employed. A substrate such as pumice, for example, may be employed. However, with utilization of a substrate care is taken to avoid introduction of impurities which might result in inaccuracy of the measurements obtained. Tests have also been run on nickel, iron and molybdenum oxide but copper oxide in conjunction with vitreous carbon is preferred.

SECOND EMBODIMENT

Satisfactory results have been obtained also by using a packing 12 of particulate matter consisting of oxides of platinum group metals, such as platinum-oxide, ruthenium-oxide, rhodium-oxide, palladium-oxide, osmium-oxide or iridium-oxide together with vitreous carbon or a mixture of both copper-oxide and platinum metal oxides with vitreous carbon.

While a particular form of the invention has been fully illustrated and described, it will be obvious to those skilled in the art that various modifications and alterations may be made therein and it is intended to cover all such modifications and alterations as may fall within the spirit and scope of the invention.

What is claimed is:

1. The method of converting ammonia in a gaseous mixture to nitric oxide which comprises the steps of:
    passing the mixture over a body of particulate matter comprising vitreous carbon and an oxide of a metal selected from the group consisting of a platinum group metal, copper, nickel, cobalt and iron, and maintaining the temperature in excess of 400°C.

2. The method of quantitatively determining ammonia content of a gaseous mixture which comprises the steps defined in claim 1 together with the steps of reacting the nitric oxide with ozone to produce an oxide of nitrogen with the emission of light energy and measuring the emitted light energy.

3. The method defined in claim 1 wherein the oxide is an oxide of a platinum group metal.

4. The method defined in claim 1 wherein the oxide is a mixture of copper oxide and an oxide of a platinum group metal.

5. The method defined in claim 1 wherein the particulate matter comprises vitreous carbon and copper oxide and the temperature is maintained in the range between 400° and 460°C.

6. The method defined in claim 5 wherein the particulate matter is in the form of filaments of a length of approximately ½ inch.

* * * * *